(12) United States Patent
Gonda (10) Patent No.: US 12,431,166 B2
(45) Date of Patent: Sep. 30, 2025

(54) ROTATABLE BODY MOUNTING DEVICE AND HARD DISK MANUFACTURING METHOD

(71) Applicant: KOMURA-TECH Co., Ltd., Osaka (JP)

(72) Inventor: Makoto Gonda, Kanagawa (JP)

(73) Assignee: KOMURA-TECH CO., LTD., Osaka (JP)

( * ) Notice: Subject to any disclaimer, the term of this patent is extended or adjusted under 35 U.S.C. 154(b) by 0 days.

(21) Appl. No.: 18/603,486

(22) Filed: Mar. 13, 2024

(65) Prior Publication Data

US 2024/0347074 A1 Oct. 17, 2024

(30) Foreign Application Priority Data

Apr. 12, 2023 (JP) ................................. 2023-064685

(51) Int. Cl.
*G11B 17/022* (2006.01)
*B23P 19/00* (2006.01)
*B23P 19/10* (2006.01)

(52) U.S. Cl.
CPC .......... *G11B 17/022* (2013.01); *B23P 19/006* (2013.01); *B23P 19/10* (2013.01); *Y10T 29/49025* (2015.01)

(58) Field of Classification Search
None
See application file for complete search history.

(56) References Cited

U.S. PATENT DOCUMENTS

| | | | | |
|---|---|---|---|---|
| 5,077,888 | A * | 1/1992 | Tokisue et al. | G11B 17/038 29/467 |
| 7,295,002 | B2 * | 11/2007 | Guzik et al. | G11B 17/038 360/99.12 |
| 2008/0062563 | A1 * | 3/2008 | Pettman et al. | G11B 5/59633 360/137 |
| 2008/0062855 | A1 * | 3/2008 | Warn et al. | G11B 5/59633 369/258.1 |
| 2023/0075577 | A1 * | 3/2023 | Hirano | G11B 17/028 |

FOREIGN PATENT DOCUMENTS

| | | |
|---|---|---|
| JP | 2-218526 | 8/1990 |
| JP | 2007-58948 | 3/2007 |
| JP | 2009-32981 | 2/2009 |
| JP | 2016-136446 | 7/2016 |

OTHER PUBLICATIONS

Decision to Grant a Patent dated May 9, 2024 in Japanese Patent Application No. 2023-064685, with English Translation.

* cited by examiner

*Primary Examiner* — Craig A. Renner
(74) *Attorney, Agent, or Firm* — Wenderoth, Lind & Ponack, L.L.P.

(57) ABSTRACT

A rotatable body is configured to be held to a holding surface of a holder in a non-contact state by an action of air, and a movable shaft having a same axial center as a rotation shaft. A leading end of the movable shaft directly faces an end of the rotation shaft. The movable shaft is housed in an insertion part of the holder so as to be movable in an axial direction. Centering is automatically performed by making a Bernoulli effect appear by the air flowing from a side of a first surface of the rotatable body opposite to a second surface of the rotatable body toward the second surface of the rotatable body through a space between an outer periphery of the movable shaft or an outer periphery of the rotation shaft and a peripheral edge of a mounting hole.

6 Claims, 9 Drawing Sheets

ROTATABLE BODY MOUNTING DEVICE AND HARD DISK MANUFACTURING METHOD

BACKGROUND OF THE INVENTION

1. Field of the Invention

This invention relates to a rotatable body mounting device for mounting a rotatable body to a rotation shaft and a hard disk manufacturing method.

2. Description of the Related Art

Conventionally, there has been known a rotatable body mounting device with which a magnetic disk (rotatable body) formed in a disk-like shape with a mounting hole bored in the center thereof is mounted to a rotationally-operated rotation shaft by inserting the magnetic disk into the rotation shaft.

For instance, Japanese Unexamined Patent Application Publication No. 2016-136446 (hereinafter, "JP 2016-136446") discloses a rotatable body mounting device of a type that includes a holder having a holding surface that directly faces a surface to be held being one side of a magnetic disk and holds the magnetic disk, an actuation mechanism for moving the magnetic disk held by the holder, exhaust equipment for discharge of air, and suction equipment for suction of air, wherein the air to be sucked makes the magnetic disk held to the holding surface, and meanwhile, the air to be discharged makes a space formed between the surface to be held of the magnetic disk held by the holder and the holding surface, thereby bringing the surface to be held and the holding surface into non-contact with each other.

According to the rotatable body mounting device disclosed in JP 2016-136446, even with the rotatable body held by the holder, movement of the rotation shaft in the direction along the holding surface of the holder is permitted, and accordingly, there is the advantage that centering for making the center of the mounting hole positioned on the axial center of the rotation shaft is facilitated, resulting in easy operation for inserting the rotation shaft into the mounting hole.

On the other hand, it is difficult for the above rotatable body mounting device to automatically perform centering work itself, with the rotation shaft placed in non-contact with a peripheral edge of the mounting hole. Incidentally, J P 2016-136446 contains a description concerning the details of technology of generating force necessary for the centering by an action of air, in which case, however, the generated force is so extremely small that it is difficult to allow the centering work to be automatically performed only with such small force.

SUMMARY OF THE INVENTION

Problems to be Solved by the Invention

An object of the present invention is to automatically perform centering for making the center of a mounting hole of a rotatable body positioned on the axial center of a rotation shaft, with the rotation shaft placed in non-contact with a peripheral edge of the mounting hole, when inserting the rotation shaft into the mounting hole of the rotatable body.

Means for Solving the Problems

To solve the above problems, the present invention provides a rotatable body mounting device that is to mount a rotatable body to a rotation shaft, and comprises a holding unit that includes a holder having a holding surface directly facing a surface to be held being one side of a plate-shaped rotatable body and holds the rotatable body to the holding surface side; an actuation mechanism for moving the holder in the axial direction of the rotation shaft, in a state where a mounting hole bored in the rotatable body held to the holding surface side is positioned on an extension line of the rotation shaft; and a movable shaft having the same axial center as the rotation shaft and whose leading end being one end surface of the movable shaft directly faces an insertion-side end being one end of the rotation shaft, wherein said holder is formed with an insertion part opened to the holding surface side to house at least partly an outer peripheral surface of the movable shaft movably in the axial direction and also to allow for insertion of the rotation shaft; the actuation mechanism is constituted so as to allow for switching, from one to the other and from the other to the one, between a movable shaft-side mounting state in which at least the leading end of the movable shaft is protruded outwards from the insertion part and in which the rotatable body when the movable shaft portion protruded outwards from the insertion part is in the state of being inserted into the mounting hole is held by the holder and a rotation shaft-side mounting state in which the rotatable body when the rotation shaft is in the state of being inserted into the mounting hole is held by the holder and in which a portion including the leading end of the movable shaft and the insertion-side end of the rotation shaft is housed in the insertion part; the holding unit includes intake equipment that allows air on the side of a surface opposite to the surface to be held in the rotatable body to flow in a space between an inner peripheral surface of the insertion part and an outer peripheral surface of the rotation shaft or that of the movable shaft through a space between the mounting hole and the outer peripheral surface of the rotation shaft or that of the movable shaft during the movable shaft-side mounting state or during the rotatable shaft-side mounting state, and exhaust equipment that discharges the air from a discharge port opened to the holding surface side toward the surface to be held; the intake equipment and the exhaust equipment are constituted so as to cause the intake and exhaust air to hold the rotatable body to the holding surface side such that movement of the surface to be held of the rotatable body is permitted in non-contact with the holding surface; and the intake equipment is constituted so as to make Bernoulli effect appear by the intake air during the movable shaft-side mounting state or during the rotation shaft-side mounting state, thereby moving the rotatable body such that the center of the mounting hole is positioned on the axial center of the rotation shaft.

There may be provided an energizing member for energizing the movable shaft toward the side where the movable shaft portion is protruded outwards from the insertion part, wherein the movable shaft may be constituted such that, during switching from the movable shaft-side mounting state to the rotation shaft-side mounting state, the leading end of the movable shaft comes into abutment with the insertion-side end of the rotation shaft, followed by being pushed in up to the inside of the insertion part against the energizing force of the energizing member.

The exhaust equipment includes an exhaust port opened in a position farther from the insertion part than the discharge port in the holding surface side, wherein the exhaust equipment may be structured to allow the air discharged from the discharge port to be exhausted outwards from the exhaust port.

The rotatable body may be a magnetic disk with a mounting hole bored in the center thereof.

Meanwhile, a hard disk manufacturing method of the present invention is to manufacture a hard disk using the rotatable body mounting device, and comprises a movable shaft-side mounting process for switching to the movable shaft-side mounting state, and a rotation shaft-side mounting process for switching from the movable shaft-side mounting state to the rotation shaft-side mounting state.

Effects of the Invention

When mounting the rotatable body to the rotation shaft, centering of the rotatable body for making the center of the mounting hole positioned on the axial center of the rotation shaft can be automatically performed by utilizing Bernoulli effect, with the rotation shaft placed in non-contact with the peripheral edge of the mounting hole.

MODE FOR EMBODYING THE INVENTION

Figure 1:
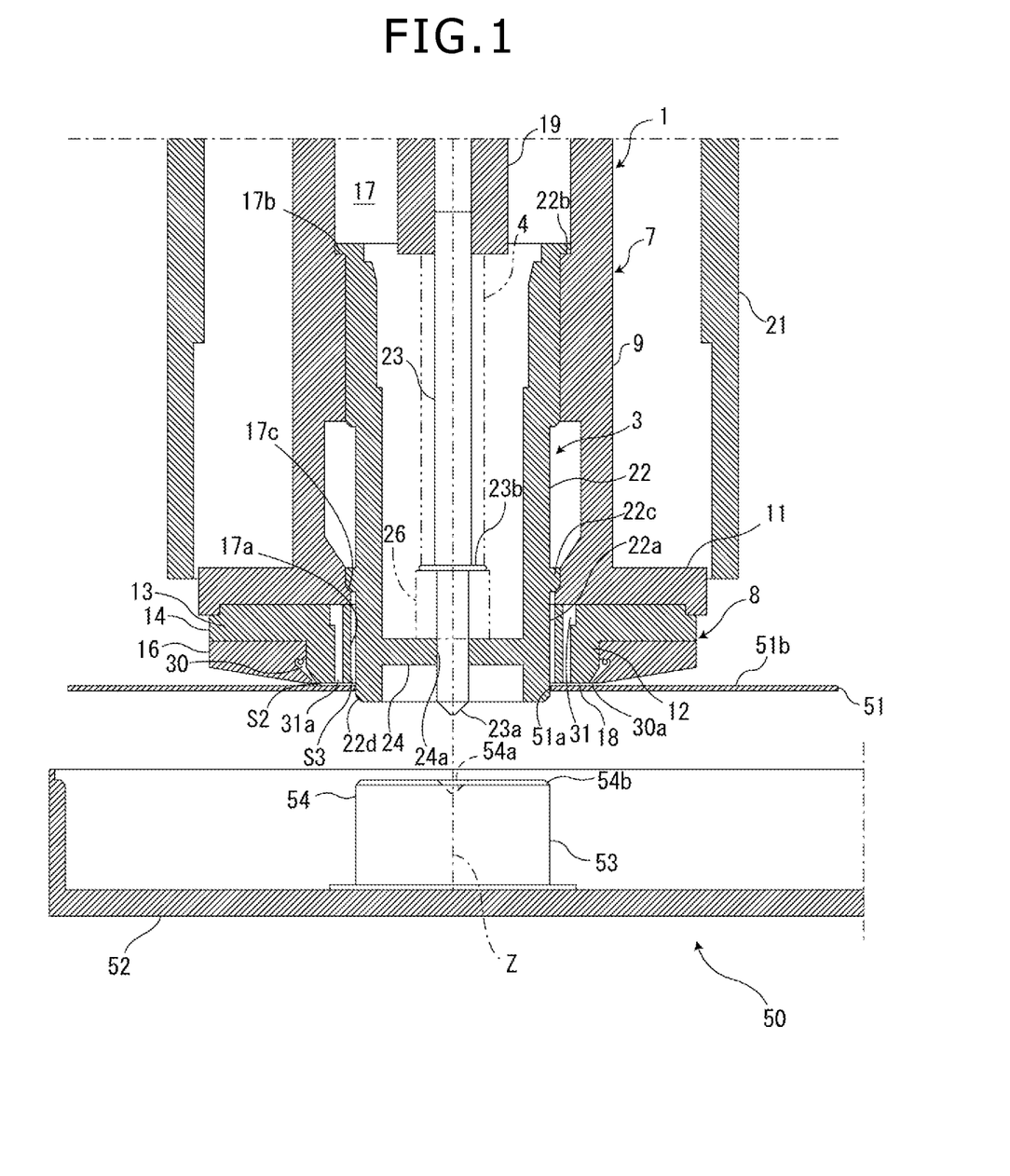
FIG. 1 is a sectional view showing the constitution of the main part of a magnetic disk mounting device applied with the present invention.
Figure 2:
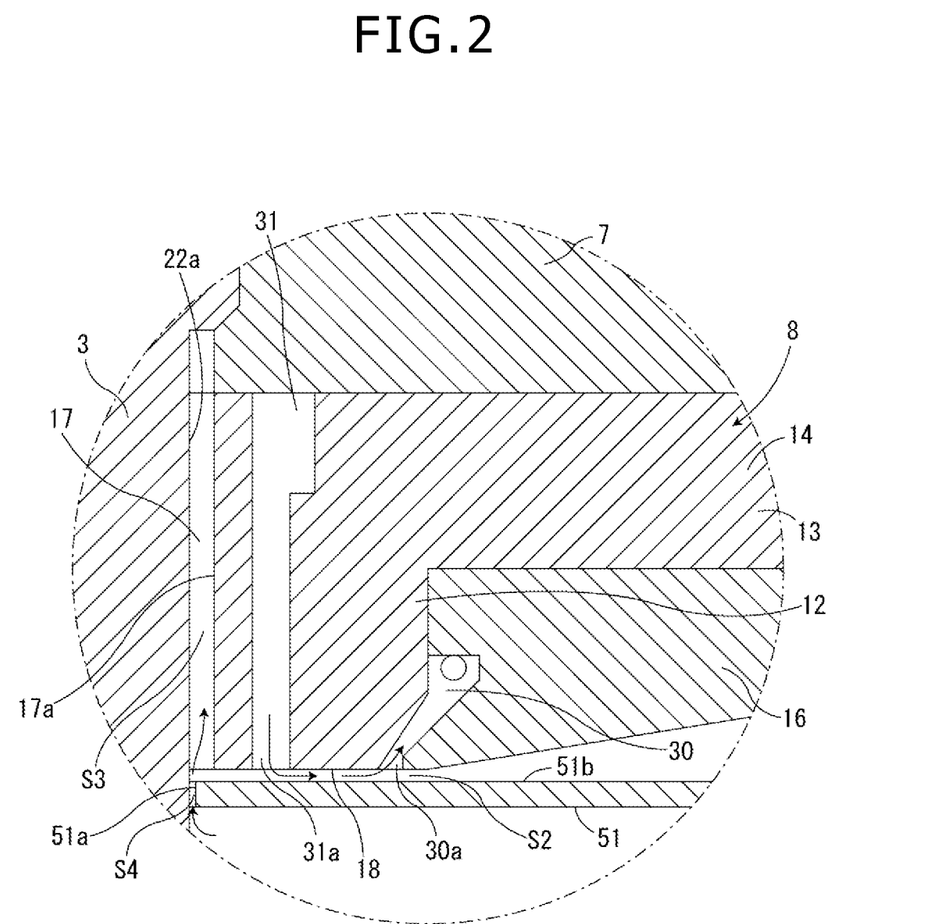
FIG. 2 is an enlarged view of the main part in FIG. 1.
Figure 3:
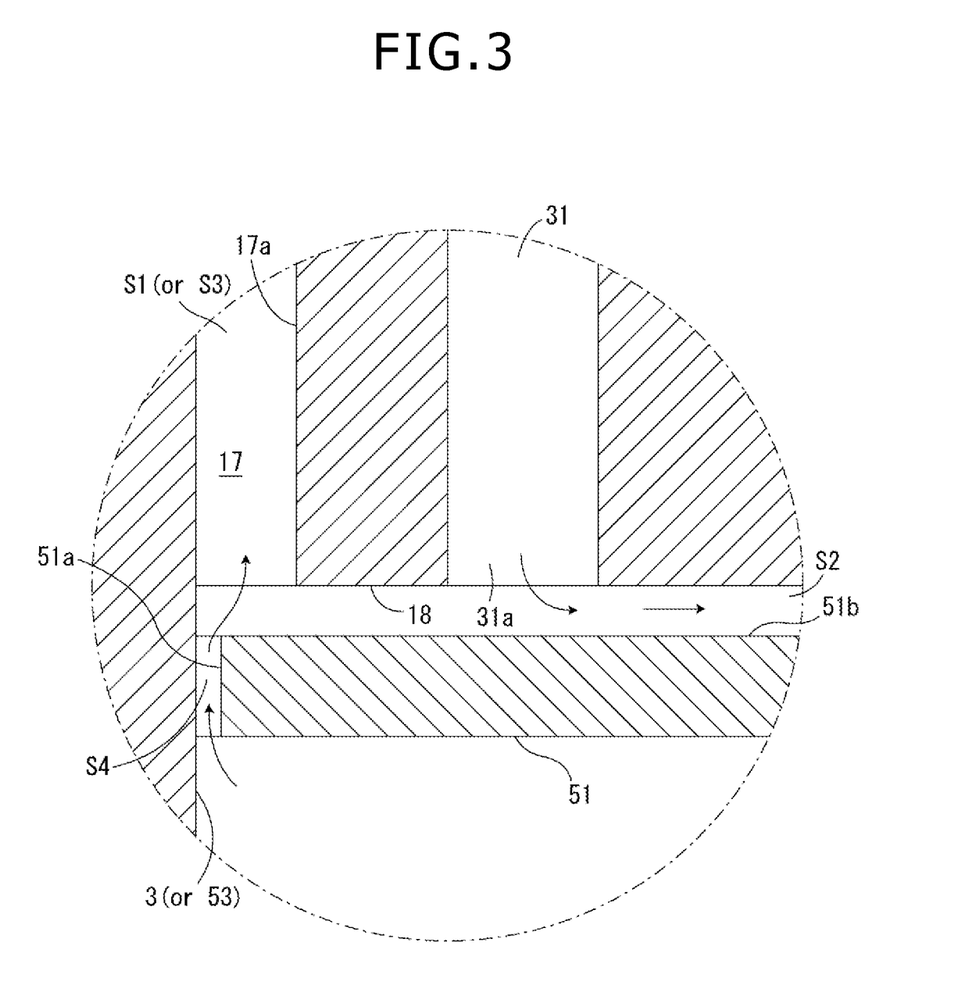
FIG. 3 is an enlarged view of the main part in FIG. 2.

FIG. 1 is a sectional view showing the constitution of the main part of a magnetic disk mounting device applied with the present invention, FIG. 2 is an enlarged view of the main part in FIG. 1, and FIG. 3 is an enlarged view of the main part in FIG. 2. The magnetic disk mounting device (rotatable body mounting device) shown constitutes a part of a hard disk assembling machine, and is to assemble (mount) a magnetic disk (rotatable body) 51 to a positioned and set workpiece 50.

The workpiece 50 constitutes a part of a hard disk being a type of magnetic disk device. By mounting all various components including the magnetic disk 51 to the workpiece 50, the hard disk is assembled completely.

The workpiece 50 shown has a casing body 52 in the form of a thick and rectangular parallelepiped-shaped box with one surface side opened, and a cylindrically-shaped rotation shaft 53 rotatably supported on the inner bottom surface-side of the casing body 52. After the components are assembled inside the casing body 52 completely, the opening side of the casing body 52 is closed by a casing cover (not shown) parallel or nearly parallel to the bottom surface of the casing body 52.

The rotation shaft 53 is formed protruding in the direction vertical to the bottom surface of the casing body 52 and ranging from the bottom surface of the casing body to the inner surface side of the casing cover. The rotation shaft 53 is rotationally driven by a motor (not shown) at least partly housed in the rotation shaft. An end surface at a protrusion-side end (insertion-side end) 54 of the rotation shaft 53 is formed with an engaging hole 54*a* positioned on an axial center Z of the rotation shaft 53 and conically recessed toward the bottom surface side of the casing body 52.

The magnetic disk 51 is formed in a disk-like shape and has, in the center thereof, a circular-shaped mounting hole 51*a* for insertion of the rotation shaft 53 in a fitted state. Incidentally, to actualize such insertion in the fitted state, an outer peripheral surface of the rotation shaft 53 has a cross-section (a cut surface shape obtained by cutting along an axially perpendicular plane) of the same or nearly same circular shape as the mounting hole 51*a*.

This magnetic disk mounting device holds the magnetic disk 51 in an attitude of making a magnetic disk thickness direction directed to the axial direction of the rotation shaft 53, and moves the magnetic disk 51 toward one side (lower side in FIG. 1., which will be hereinafter referred to as "mounting side") in the axial direction of the rotation shaft 53, in a state where the center of the mounting hole 51*a* is positioned on the axial center Z of the rotation shaft 53, thereby inserting the rotation shaft 53 into the mounting hole 51*a* to mount the magnetic disk 51 to the rotation shaft 53.

Incidentally, the rotation shaft 53 is mounted with more than one magnetic disk 51. These magnetic disks 51 mounted to the rotation shaft 53 are kept to be spaced apart from each other by a spacer interposed between the mutually adjacent magnetic disks in the axial direction of the rotation shaft 53.

One or both sides of the magnetic disk 51 function as a storage surface for storage of mass information by means of various magnetisms. Dust and/or fine fragments or like foreign matters when adhered to the storage surface are the cause of malfunctional operation. Accordingly, when inserting the rotation shaft 53 into the mounting hole 51*a* of the magnetic disk 51 and/or when moving the magnetic disk 51 in the axial direction of the rotation shaft 53 in a state where the rotation shaft 53 is inserted into the mounting hole 51*a*, the end surface 54 and/or the outer peripheral surface of the rotation shaft 53 comes in contact with the peripheral edge of the mounting hole 51*a* to thereby bring about generation of the fine fragments or like foreign matters, in which case, the fine foreign matters when adhered to the storage surface of the magnetic disk 51 causes operational defects of the hard disk.

In short, there exists the need to minimize the contact between the magnetic disk 51 and the rotation shaft 53 during mounting of the magnetic disk 51 to the rotation shaft 53.

It is to be noted that other constitutions of the hard disk, inclusive of the constitution of the magnetic disk 51 and that of the rotation shaft 53, have been conventionally known, and hence, their detailed description shall be omitted.

The constitution of the magnetic disk mounting device will be next detailed with reference to FIGS. 1 to 9.

The magnetic disk mounting device comprises a loading board (not shown) positioned and set in an attitude of facing the opening side of the casing body 52 of the workpiece 50 vertically toward the upper side, a holding unit including a holder 1 that directly faces one side (upper surface in this embodiment, which will be hereinafter referred to as "surface to be held") of the magnetic disk 51 and holds the magnetic disk 51, an actuation mechanism 2 (see FIG. 5) for moving, in the axial direction of the rotation shaft 53, the holder 1 in the state of holding the magnetic disk 51, a movable shaft 3 having the same axial center Z as the rotation shaft 53 of the workpiece 50 positioned and set on the loading board and axially movably supported on the holder 1-side, and an energizing member 4 for elastically energizing the movable shaft 3 toward the workpiece 50.

A relative position between the workpiece 50 positioned and set on the loading board and the holder 1 is changed by a relative position changing mechanism 6 (see FIG. 5) for displacing one or both of the loading board position and the holder 1-position. During mounting of the magnetic disk 51 to the rotation shaft 53, the relative position changing mechanism 6 is operated such that the mounting hole 51a of the magnetic disk 51 held by the holder 1 is positioned on an extension line of the rotation shaft 53 (specifically, the center of the mounting hole 51a is positioned on the axial center Z of the rotation shaft 53).

Here, the relative position with respect to the rotation shaft 53 in planar view in the holder 1 when the center of the mounting hole 51a of the magnetic disk held by the holder itself is in the state of being positioned on the axial center Z of the rotation shaft 53 will be hereinafter referred to as "mounting position". Unless otherwise specified in the following, the holder 1 shall be assumed to be in the mounting position.

The holder 1 is supported reciprocally in the axial direction of the rotation shaft 53, and has a slide member 7 and a holding member 8 fixedly mounted to a workpiece 50-side end (lower end) of the slide member 7.

The slide member 7 integrally has a cylindrically-shaped slide part 9 having the same axial center as the rotation shaft 53, and a flange-shaped mounting part 11 extended from the workpiece 50-side end in the outer peripheral surface of the slide part 9 radially outwards over the entire circumference.

The holding member 8 is partly formed also of a main body 14 including a cylindrically-shaped holding part 12 having the same axial center as the rotation shaft 53 and arranged on the side nearer to the mounting side than the slide member 9 and a flange-shaped part to be mounted 13 extended from the mounting part 11-side end in the outer peripheral surface of the holding part 12 radially outwards over the entire circumference, and a circular ring-shaped exterior finish body 16 formed separately from the main body 14 and externally fixed to the holding part 12.

The inner peripheral surface of the slide part 9 of the slide member 7 and that of the holding part 12 of the holding member 8 are integrally connected together at the ends thereof to constitute an insertion hole (insertion part) 17. The workpiece 50-side end surface of the exterior finish body 16 and that of the holding part 12 constitute a flat and flush holding surface 18.

The above constitution provides the insertion hole 17 having the same axial center as both the rotation shaft 53 and the movable shaft 3 and being open to the above holding surface 18-side. The rotation shaft 53 is inserted removably into the insertion hole 17 through its opening in a fitted state. With this demand, an insertion region 17a being a range of the insertion hole 17 for insertion of the rotation shaft 53 has the same diameter over the whole in the axial center Z-direction and whose cross-section is in a circular shape slightly larger in diameter than the outer peripheral surface of the rotation shaft 53. Accordingly, in a state where the rotation shaft 53 is inserted accurately into the insertion region 17a, there is formed a doughnut-shaped space S1 between the inner peripheral surface of the insertion region 17a and the outer peripheral surface of the rotation shaft 53 with the equal spacing over the entire circumference.

The insertion region 17a is formed on the side nearest to the opening in the inner periphery of the insertion hole 17. In an inner region on the side further inside than the insertion region 17a of the insertion hole 17, there are provided step-shaped locking parts 17b, 17c arranged in the direction (axial center Z-direction) in which the insertion hole is formed. Each of the locking parts 17b, 17c is formed on the inner peripheral surface of the insertion hole 17 over the entire circumference, and has a circular ring-like shape when seen from the axial center Z-direction.

The above constitution provides the holding surface 18 having a circularly annular shape surrounding the insertion hole 17 when seen from the axial center Z-direction. To the holding surface 18, the magnetic disk 51 is held in a non-contact state by a means described later. Specifically, the magnetic disk 51 is held by the holder 1, in a state where a space S2 is formed over the whole of a directly-facing region in between the holding surface 18 and the surface to be held 51b.

The holder 1 further integrally has a support part 19 arranged in an inner peripheral surface-side space of the slide part 9 of the slide member 7. The support part 19 is formed in a cylindrical shape with the same axial center as the slide part 9 and smaller in diameter than the slide part 9. The outer peripheral surface side of the slide part 9 is covered with a cover member 21 over the entire circumference. The cover member 21 is formed in a cylindrical shape with the same axial center as the slide part 9 and larger in diameter than the slide part 9.

The movable shaft 3 has a shaft body 22 formed in a cylindrical shape with the same axial center as the slide part 9 of the slide member 7 and smaller in diameter than the slide part 9 and a support shaft 23 arranged in a cylindrically-shaped inner peripheral surface-side space of the shaft body 22 and linearly formed so as to have the same axial center as the shaft body 22.

The shaft body 22 has an outer peripheral surface at least partly (mostly or wholly in the illustrated embodiment) housed in the insertion hole in a fitted state and is supported reciprocally in its own axial center Z-direction.

A major-part region (operating region) 22a that allows for insertion into the insertion region 17a in the outer peripheral surface of the shaft body 22 has the same or nearly same diameter over the whole in the axial center Z-direction and whose cross-section is in a circular shape smaller in diameter than the inner peripheral surface of the insertion region 17a and identical or nearly identical with a cross-sectional shape of the outer peripheral surface of the rotation shaft 53. Accordingly, there is formed a doughnut-shaped space S3 between the inner peripheral surface of the insertion region 17a and the outer peripheral surface of the operating region 22a with the equal spacing over the entire circumference.

The operating region 22a is located near the opening-side end of the insertion hole 17 in the outer peripheral surface of the shaft body 22. Meanwhile, in an inner region located on the side further inside the insertion hole 17 than the operating range 22a in the outer peripheral surface of the shaft body 22, parts to be locked 22b, 22c dedicated to the locking parts 17b, 17c are formed in correspondence with these locking parts. There are provided a plurality of parts to be locked 22b, 22c arranged in the axial direction of the shaft body 22, and spacing between the mutually adjacent parts to be held 22b, 22c is also set to be identical or nearly identical with spacing between the mutually adjacent locking parts 17b, 17c.

The end surface at the operating region 22a-side end (leading end) of the shaft body 22 directly faces the end surface at the insertion-side end 54 of the rotation shaft 53. In the inner peripheral surface-side space of the shaft body 22, a leading end-side portion of this space is wholly closed by a closing part 24, and meanwhile, a basal end being an end opposite to the leading end is wholly opened. The closing part 24 has, in its center located on the axial center Z, an insertion hole 24a bored for insertion of the support shaft 23.

The operating region 22a-side end (leading end) 23a in the support shaft 23 constitutes a conically-shaped engaging part that is to be inserted into the engaging hole 54a in a fitted state. The outer peripheral surface of a leading end-side portion of the support shaft 23 is inserted into the insertion hole 24a, and meanwhile, an end (basal end)-side portion opposite to the leading end is inserted in the state of being fitted to the cylindrically-shaped inner peripheral surface side of the support part 19. The support shaft 23 is supported, at two places being the support part 19 and the closing part 24, by both the shaft body 22 and the holder 1 reciprocally in its own axial center Z-direction.

A portion on the side (inner side) farther from the leading end 23a than a portion inserted into the insertion hole 24a in the support shaft 23 is externally mounted with a coupling sleeve 26 movably in the axial direction. A flanged- and circularly annular-shaped locking part 23b for expansion of a support shaft diameter over the entire circumference is integrally extended from the outer peripheral surface of a portion on the side further inside than a portion mounted with the coupling sleeve 26 in the support shaft 23.

The energizing member 4 is a compression coil spring externally mounted on the support shaft 23. The energizing member 4 is interposed in a compressed state between the end of the support part 19 and the locking part 23b.

The energizing member 4 applies elastic energizing force to energize the movable shaft 3 at all times to the side where the movable shaft is protruded outwards from the insertion hole 17 (namely, the workpiece 50-side, which will be hereinafter referred to as "protruding side"), while keeping the relative position between the support shaft 23 and the shaft body 22 constant by abutment of one end of the coupling sleeve 26 on the closing part 24 and by that of the other end on the locking part 23b.

Incidentally, the support shaft 23 when the relative position of the support shaft 23 with respect to the shaft body 22 is kept constant goes into a state where the engaging part 23a is further protruded from the leading end of the shaft body 22 toward the workpiece 50-side and thereby gets exposed to the outside.

The movable shaft 3 is moved toward the protruding side with respect to the holder 1 by the energizing force from the energizing member 4. However, when the movable shaft 3 reaches a prescribed protruding-side position (protruding position) in the holder 1 (see FIG. 1), the parts to be locked 22b, 22c are individually and simultaneously locked by the respectively corresponding locking parts 17b, 17c, and accordingly, further movement of the movable shaft toward the protruding side with respect to the holder 1 is restricted (more specifically, prohibited).

The movable shaft 3 in the state of being locked at the protruding position of the holder 1 in this manner is reciprocated axially (specifically, in the axial center Z-direction) as an integral part of the holder 1, in a state where at least the leading end (only the leading end in this embodiment) of the movable shaft is protruded from the insertion hole 17 (the holder 1) toward the outwardly protruding side.

A movable shaft 3-portion protruded from the holder 1 (the insertion hole 17) toward the outwardly protruding side is inserted into the mounting hole 51a, thereby bringing about switching to a state (movable shaft-side mounting state) in which the magnetic disk 51 is mounted to the outer peripheral surface of the leading end of the holder 1.

When the holder 1 when the movable shaft 3 is in the state of being locked at the protruding position is moved to the mounting side, there occurs switching to a state (abutment state) in which the end surface of the leading end of the movable shaft 3 (exactly, the end surface of the leading end of the shaft body 22) is firstly brought into abutment with the end surface in the insertion-side end 54 of the rotation shaft 53 and in which the engaging part 23b is inserted into the engaging hole 54a for engagement therewith. Engagement of the engaging part 23b with the engaging hole 54a enables the axial center Z of the movable shaft 3 and that of the rotation shaft 53 to be prevented from being displaced from each other.

When the holder 1 is moved further toward the mounting side from the abutment state, there occurs switching to a state (insertion state) in which the movable shaft 3 is pushed in toward the inner side of the insertion hole 17 against the energizing force of the energizing member 4 by abutment with the rotation shaft 3 so that a portion including the leading end of the movable shaft 3 is housed in the insertion hole 17 (in this embodiment, the whole movable shaft 3 is housed in the insertion hole 17 completely) and accordingly, a portion including the insertion-side end 54 of the rotation shaft 53 is also inserted into the insertion hole 17.

The holding unit has, in addition to the holder 1, an air equipment unit 27 (see FIG. 5) for holding the magnetic disk 51 to the holder 1 displaceably in a non-contact state.

Figure 5:
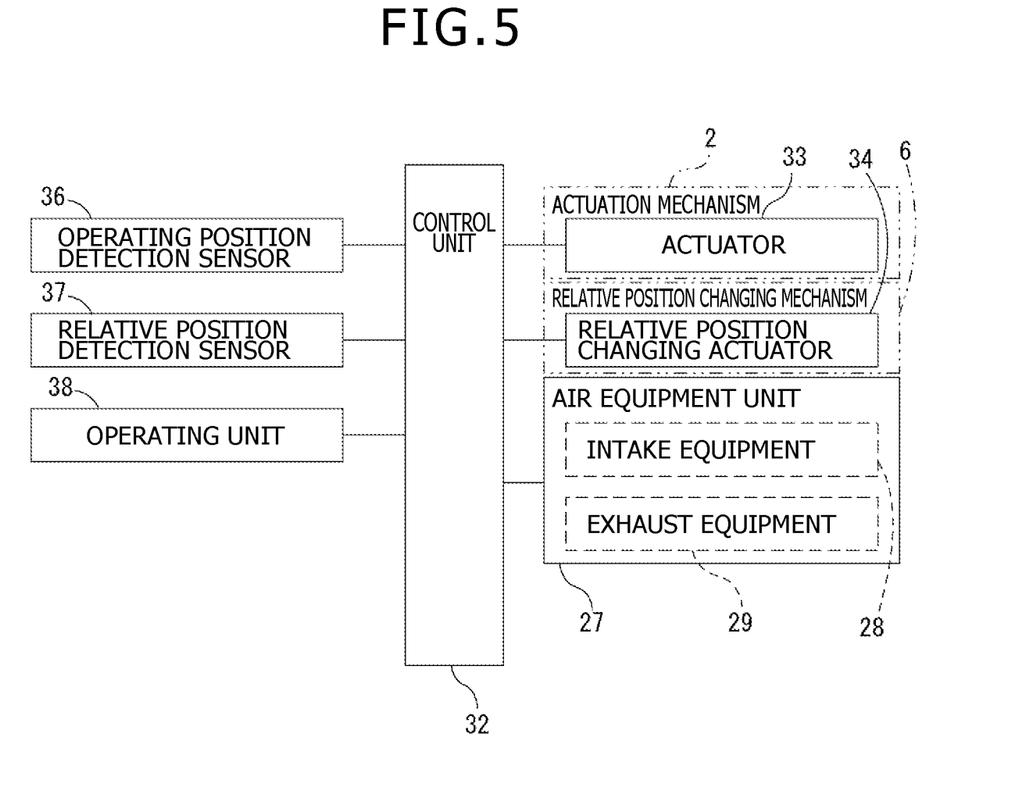
FIG. 5 is a block diagram showing the constitution of the magnetic disk mounting device.

The air equipment unit 27 has intake equipment 28 for intake of air and exhaust equipment 29 for discharge of air (see FIG. 5). The air equipment unit 27 performs flow-passage switching using an electromagnetic valve, together with intake and/or compression of air using a compressor etc.

The intake equipment 28 sucks air to thereby allow the air on the side of a surface (lower surface in this embodiment) opposite to the surface to be held 51b of the magnetic disk 51 held to the holding surface 18-side of the holder 1 to flow toward the spaces S1, S3 from a space S4 formed between the outer peripheral surface of the rotation shaft 53 or that of the movable shaft 3 (specifically, the shaft body 22) inserted into the mounting hole 51a and the peripheral edge of the mounting hole 51a. The air flowing in the spaces S1, S3 flows further inwards (upwards in this embodiment in FIG. 1) within the insertion hole 17, followed by being sucked from a suction port (not shown) by the compressor etc.

Meanwhile, the exhaust equipment 29 has a flow passage 31 bored in the holding part 12 and extending in the direction parallel to the axial center Z. There are provided a plurality of flow passages 31 arranged evenly at predetermined spacing in the circumferential direction of the cylindrically-shaped holding part 12. The holding surface 18-side end of the flow passage 31 constitutes an opened discharge port 31a. The compressed air flows through the flow passage 31, followed by being discharged from the discharge port 31a toward the surface to be held 51b.

In the illustrated embodiment, between the outer peripheral surface of the holding part 12 of the main body 14 in the holding member 8 and that of the exterior finish body 16, there is formed an exhaust passage 30 being opened to the holding surface 18-side. In other words, the holding surface 18-side of the exhaust passage 30 is formed with an exhaust port 30a that makes the exhaust passage itself open. With the above arrangement relation, the exhaust port 30a is arranged at a position farther from the insertion hole 17 than the discharge port 31a in the holding surface 18. The exhaust passage 30 is constituted such that the air discharged from the discharge port 31a and thereafter flowing in the direction (outwards) away from the axial center Z within the space S2 is allowed to flow in the exhaust passage itself from the exhaust port 30a, followed by being discharged to the outside.

It is to be noted that the exhaust passage 30 may be omitted, in which case, the exhaust of air from the space S2 to the outside may be performed as it is, or alternatively, the compressor etc. may be applied to generate such intake pressure as to allow the air flowing along both the surface to be held 51b and the holding surface 18 within the space S2 to flow in the exhaust passage 30.

The air sucked by the intake equipment 28 makes the surface to be held 51b of the magnetic disk 51 drawn to the holding surface 18, and meanwhile, the air discharged by the exhaust equipment 29 makes the space S2 formed between the surface to be held 51b of the magnetic disk 51 and the holding surface 18. Accordingly, the magnetic disk 51 can be held to the holding surface 18 of the holder 1 in the non-contact state planarly movably in the direction along the surface to be held 51b. To result in like this, appropriate setting of the air intake and exhaust pressures shall be made.

Figure 4:
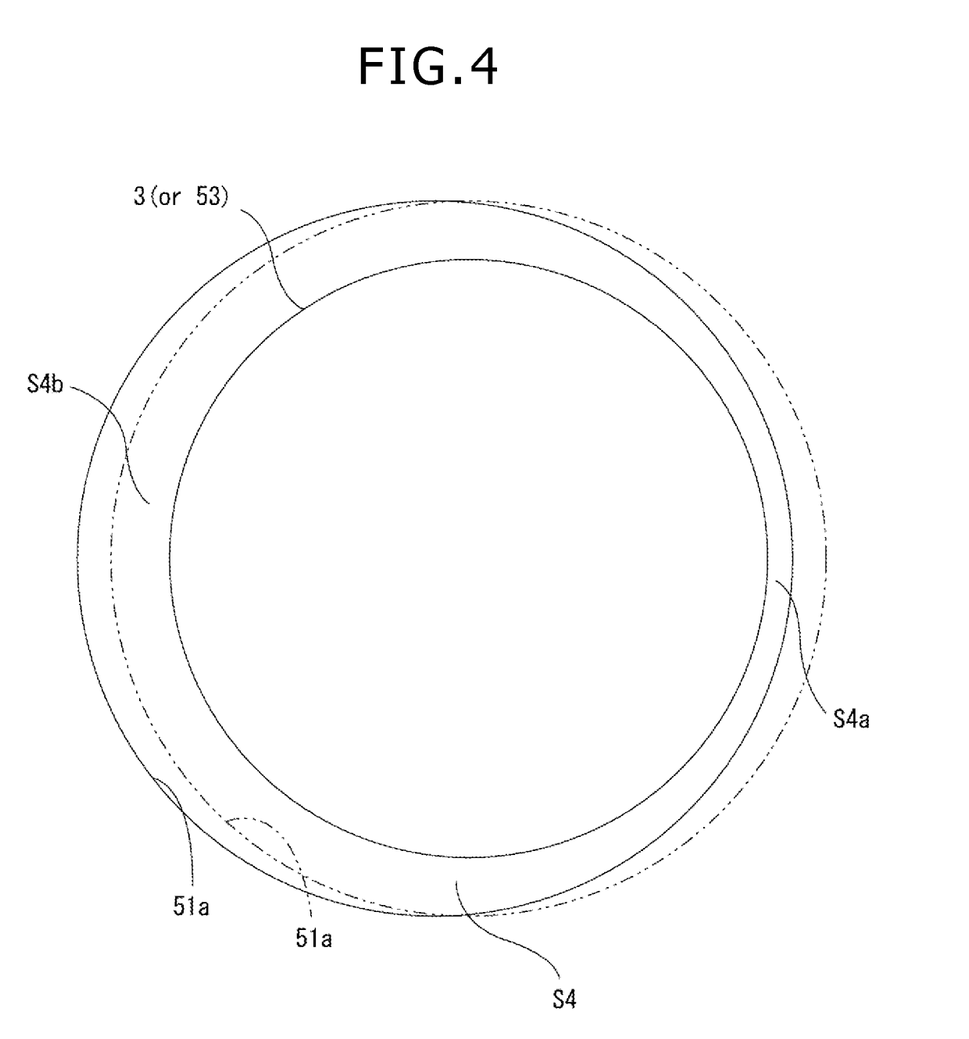
FIG. 4 is a plan view of a mounting hole and a rotation shaft or a movable shaft to schematically show Bernoulli effect.

FIG. 4 is a plan view of the mounting hole and the rotation shaft or the movable shaft to schematically show Bernoulli effect. In a state where one of the movable shaft 3 and the rotation shaft 53 is inserted into the mounting hole 51a, intake of the air when performed by the intake equipment 28 results in that the air on the side of the surface opposite to the surface to be held 51b of the magnetic disk 51 passes through the space S4 formed between the outer peripheral surface of the movable shaft 3 or that of the rotation shaft 53 and the peripheral edge of the mounting hole 51a, followed by flowing in the spaces 51, S3 formed between the outer peripheral surface of the movable shaft 3 or that of the rotation shaft 53 and the inner peripheral surface of the insertion region 17a of the insertion hole 17.

In this place, when the center of the circular-shaped mounting hole 51a of the magnetic disk 51 is out of the axial center Z (namely, a state shown by a solid line in FIG. 4, for instance, which will be hereinafter referred to as "uneven state"), spacing between the outer peripheral surface of the movable shaft 3 or that of the rotation shaft 53 and the peripheral edge of the mounting hole 51a is made uneven over the circumferential direction. During this state, air velocity is made lower due to the fact that in the space 4, a narrowly-spaced region (reduced region) S4a is larger in flow resistance than a widely-spaced region (enlarged space) S4b.

A difference in flow velocity between the reduced region S4a and the enlarged region S4b is recognized as a difference in pressure therebetween based on Bernoulli effect. Specifically, the enlarged region S4b whose flow velocity is high is made lower in pressure than the reduced region S4a whose flow velocity is low.

Until reaching a state (shown by a virtual line in FIG. 4, for instance, which will be hereinafter referred to as "even state") in which the mounting hole 51a is positioned on the axial center Z of the movable shaft 3 or that of the rotation shaft 53, the pressure difference occurs continuously. This pressure difference causes force of movement toward the side of switching from the uneven state to the even state to act on the magnetic disk 51 held by the holder 1 movably in the non-contact state. This action will be hereinafter referred to as "centering action", and this centering action enables centering work for making the center of the mounting hole 51a of the magnetic disk 51 positioned on the axial center Z to be automatically performed.

FIG. 5 is a block diagram showing the constitution of a magnetic disk mounting device. The magnetic disk mounting device is mounted with a control unit 32 constituted of components such as microcomputer for various controls.

To the output side of the control unit 32 are connected an actuator 33 such as electric motor and electric cylinder constituting a part of the actuation mechanism 2 to generate power for moving the holder 1 in the axial center Z-direction, a relative position changing actuator 34 such as electric motor and electric cylinder constituting a part of the relative position changing mechanism 6 to generate power for changing the relative position, and the air equipment unit 27.

To the input side of the control unit 32 are connected an operating position detection sensor 36 for detecting an operating position in the axial direction of the holder 1, a relative position detection sensor 37 for detecting a relative position to be changed by the relative position changing mechanism 6, and an operation unit 38 for various setting and/or manual operations.

The control unit 32 controls operation of the actuator 33 and that of the relative position changing actuator 34 based on the results of detection by both the relative position detection sensor 36 and the relative position detection sensor 37, thereby appropriately changing the operating position and the relative position to their prescribed positions for each prescribed timing.

Next will be described a hard disk manufacturing method using the magnetic disk mounting device with reference to FIGS. 1, 5 and 6 to 9.

Figure 6:
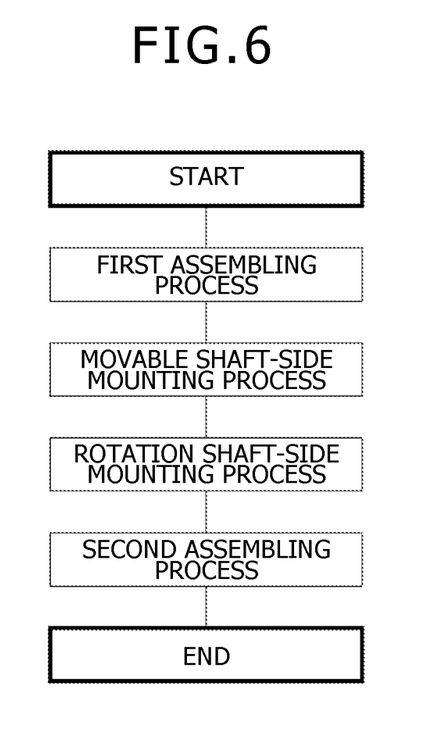
FIG. 6 is a flowchart showing the processes of a magnetic disk mounting method.
Figure 7:
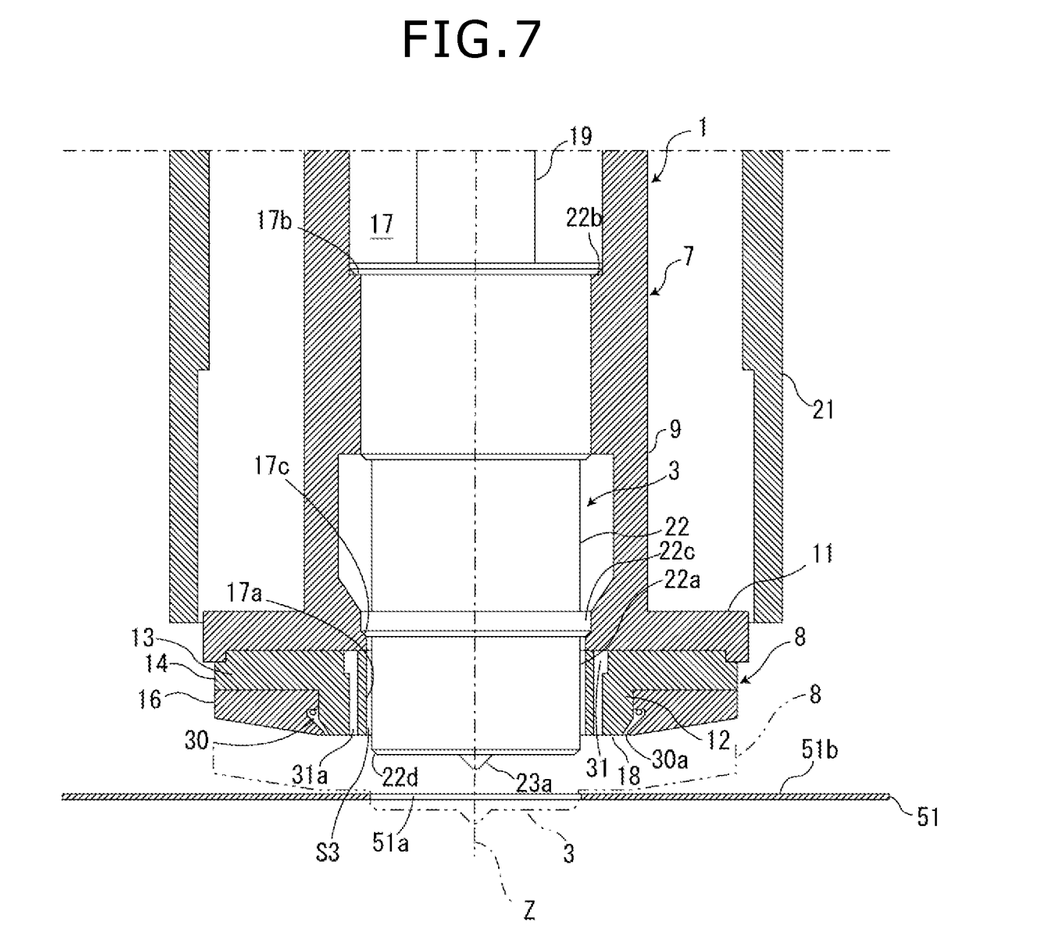
FIG. 7 is a sectional view of the main part of the magnetic disk mounting device in an initial state.
Figure 8:
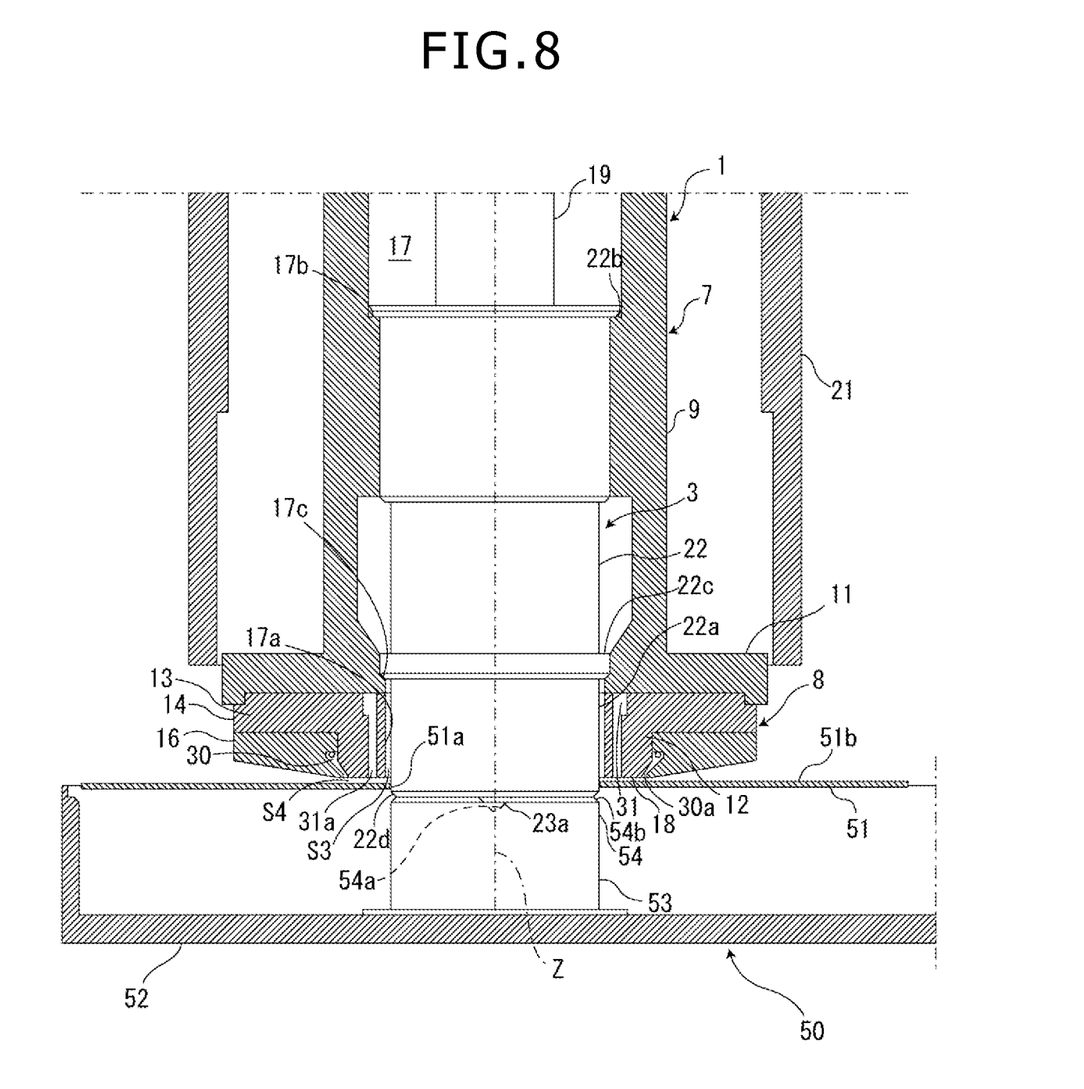
FIG. 8 is a sectional view of the main part of the magnetic disk mounting device in a movable shaft-side mounting state.
Figure 9:
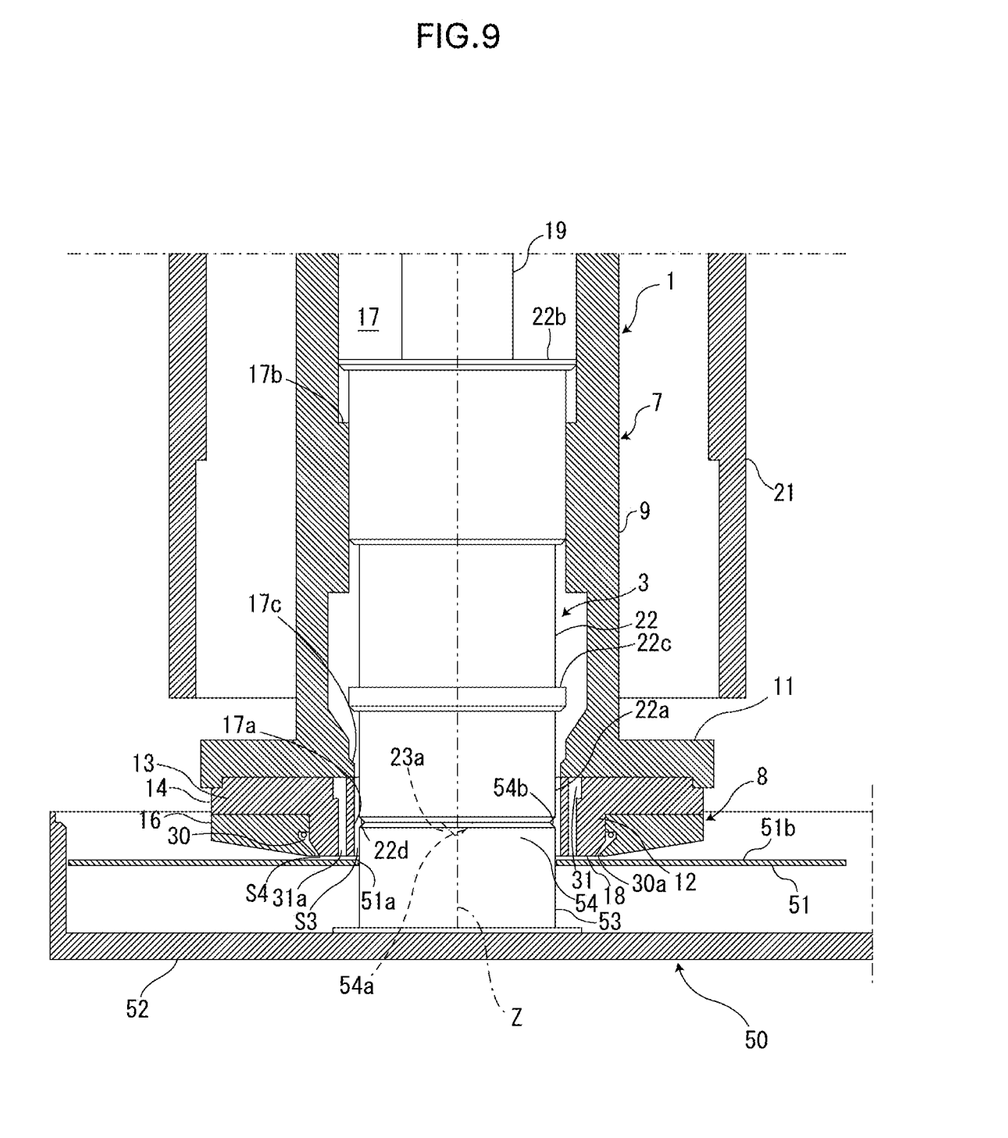
FIG. 9 is a sectional view of the main part of the magnetic disk mounting device in a rotation shaft-side mounting state.

FIG. 6 is a flowchart showing the processes of a magnetic disk mounting method. FIG. 7 is a sectional view showing the main part of the magnetic disk mounting device in an initial state, FIG. 8 is a sectional view showing the main part of the magnetic disk mounting device in the movable shaft-side mounting state, and FIG. 9 is a sectional view showing the main part of the magnetic disk mounting device in the rotation shaft-side mounting state. A hard disk manufacturing method applied with the present invention comprises a first assembling process for performing assembling of the hard disk up to the stage before mounting of the magnetic disk 51 to the rotation shaft 53, a movable shaft-side mounting process for switching from the initial state described later to the movable shaft-side mounting state subsequently to the first assembling process, a rotation shaft-side mounting process for switching from the movable shaft-side mounting state to the rotation shaft-side mounting state described later subsequently to the movable shaft-side mounting process, and a second assembling process for performing assembling of the hard disk to completion, after the magnetic disk 51 is completely mounted to the rotation shaft 53.

As shown in FIG. 7, the initial state is a state in which the center of the mounting hole 51a of the magnetic disk 51 in the state of being not held by the holder 1 is positioned at the mounting side (lower side in the illustrated embodiment) on the axial center of the holder 1 (exactly, the axial center of both the slide part 9 and the holding part 12), in a state where the movable shaft 3 is locked at the protruding position of the holder 1 and where the magnetic disk 51 is not mounted to the outer peripheral surface of the movable shaft. Incidentally, in this initial state, the relative position may be at the above mounting position or other positions, and in the latter, the dust and/or fragments or like foreign matters can be prevented from entering the casing body 52 of the workpiece 50.

In the movable shaft-side mounting process, the holder 1 is moved, in the initial state, toward the magnetic disk 51-side (lower side in the vertical direction in the illustrated embodiment) in the holder's own axial center-direction by the actuation mechanism 2 to insert the movable shaft 3 into the mounting hole 51*a*, thereby resulting in switching to the movable shaft-side mounting state.

In the switching process, when inserting at least the movable shaft 3 into the mounting hole 51*a* and in the midst of insertion, intake and exhaust of the air by the air equipment unit 27 are performed to make the centering action appear. Incidentally, in the movable shaft-side mounting process, the movable shaft 3 is inserted into the mounting hole 51*a* up to an insertion depth at which the surface to be held 51*b* of the magnetic disk 51 is made to be held to the holding surface 18.

In the outer peripheral surface of the movable shaft 3 (exactly, the outer peripheral surface of the shaft body 22), a region on the side nearer to the leading end of the movable shaft than the operating region 22*a* is formed in the shape of a taper surface 22*d* whose diameter is gradually reduced toward the end surface of the leading end of the movable shaft 3 (exactly, the leading end surface of the shaft body 22). The taper surface 22*d* enables the above insertion to be smoothly performed.

In the rotation shaft-side mounting process, the relative position is firstly changed to the mounting position by the relative position changing mechanism 6 when change of the relative position to the mounting position is not made, and meanwhile, the relative position is held as it is when the relative position is changed to the mounting position. Subsequently, by moving, toward the mounting side in the axial center Z-direction, the holder 1 in the state of holding the magnetic disk 51 with the center of the mounting hole 51*a* positioned on the axial center Z, switching from the state shown in FIG. 1 to the insertion state shown in FIG. 9 via the abutment state shown in FIG. 8 is performed, and then, the rotation shaft-side mounting process is finished.

In the switching process, when inserting at least the rotation shaft 3 into the mounting hole 51*a* and in the midst of insertion, intake and exhaust of the air by the air equipment unit 27 are performed to make the centering action appear.

Incidentally, in the rotation shaft-side mounting process, the magnetic disk 51 is moved toward the mounting side in the axial center Z-direction up to an insertion depth at which the magnetic disk 51 is positioned at a prescribed position on the outer peripheral surface of the rotation shaft 53, in a state where the rotation shaft 53 is inserted into the mounting hole 51*a*. In the moving process, it is of importance to make the centering action appear.

A leading end-side region of the insertion-side end 54 in the outer peripheral surface of the rotation shaft 53 is formed in the shape of a taper surface 54*b* whose diameter is gradually reduced toward the rotation shaft 53-end surface facing or abutting on the movable shaft 3. The taper surface 54*b* enables the above insertion to be smoothly performed.

The first and the second assembling processes have been conventionally known, and hence, their description shall be omitted.

With the above constitution, when mounting the magnetic disk 51 to the movable shaft 3 or to the rotation shaft 53 by inserting the movable shaft 3 or the rotation shaft 53 into the mounting hole 51*a*, the outer peripheral surface of the movable shaft 3 or that of the rotation shaft 53 can be effectively prevented by the centering action from coming in contact with the peripheral edge of the mounting hole 51*a*.

It is to be noted that the present invention is applicable to an optical disk or like ordinary rotatable body having a mounting hole, in addition to the magnetic disk 51.

Further, a movable shaft-side actuation mechanism for reciprocating the movable shaft 3 in the axial center Z-direction separately from the holder 1 may be provided separately from the actuation mechanism 2 to perform the operation like the above embodiment. In this case, an actuator for the movable shaft-side actuation mechanism should be provided separately from the actuator 33 to avoid complicated mechanical constitution.

Furthermore, controlling the intake and the exhaust by the control unit 32 is dispensable, and switching between the intake and the exhaust may be performed by manual operation.

EXPLANATION OF REFERENCE NUMERALS

1: Holder, 2: Actuation mechanism, 3: Movable shaft, 4: Energizing member (Compression coil spring), 17: Insertion hole (Insertion part), 18: Holding surface, 28: Intake equipment, 29: Exhaust equipment, 30*a*: Exhaust port, 31*a*: Discharge port, 51: Magnetic disk (Rotatable body, Optical disk), 51*a*: Mounting hole, 51*b*: Surface to be held, 53: Rotation shaft, 54: Insertion-side end, S1: Space, S2: Space, S3: Space

The invention claimed is:

1. A rotatable body mounting device for mounting a rotatable body to a rotation shaft, the rotatable body mounting device comprising:
   a holding unit that includes a holder having a holding surface directly facing a surface to be held of the rotatable body which is one side of the rotatable body, the holder being configured to hold the rotatable body to a holding surface-side;
   an actuation mechanism for moving the holder in an axial direction, in a state where a mounting hole in the rotatable body held to the holding surface-side is positioned on an extension line of the rotation shaft; and
   a movable shaft having a leading end which is configured to directly face an insertion-side end of the rotation shaft;
   wherein:
   the rotatable body is plate-shaped;
   an axial center of the movable shaft is configured to be a same axial center as an axial center of the rotation shaft;
   the holder includes an insertion part open to the holding surface-side to at least partly house an outer peripheral surface of the movable shaft movably in the axial direction, the insertion part being configured to allow for insertion of the rotation shaft;
   the actuation mechanism is configured to allow for switching between: (i) a movable shaft-side mounting state in which at least the leading end of the movable shaft protrudes outward from the insertion part, and the rotatable body is held by the holder when a movable shaft portion protruding outward from the insertion part is in a first state of insertion into the mounting hole; and (ii) a rotation shaft-side mounting state in which the rotatable body is held by the holder when the rotation shaft is in a second state of insertion into the mounting hole, and a portion including the leading end of the movable shaft and the insertion-side end of the rotation shaft is housed in the insertion part;

the holding unit includes intake equipment configured to allow intake air on a side of a surface opposite to the surface to be held of the rotatable body to flow in a space between an inner peripheral surface of the insertion part and an outer peripheral surface of the rotation shaft or an outer peripheral surface of the movable shaft through a space between the mounting hole and the outer peripheral surface of the rotation shaft or the outer peripheral surface of the movable shaft during the movable shaft-side mounting state or during the rotation shaft-side mounting state, and exhaust equipment configured to discharge the intake air as exhaust air from a discharge port open to the holding surface-side toward the surface to be held of the rotatable body;

the intake equipment and the exhaust equipment are configured to cause the intake air and the exhaust air to hold the rotatable body to the holding surface-side such that movement of the surface to be held of the rotatable body is permitted in non-contact with the holding surface; and the intake equipment is configured to make a Bernoulli effect appear by the intake air during the movable shaft-side mounting state or during the rotation shaft-side mounting state to move the rotatable body such that a center of the mounting hole is positioned on the axial center of the rotation shaft.

2. The rotatable body mounting device of claim 1, further comprising:

an energizing member for energizing the movable shaft toward a side where the movable shaft portion protrudes outward from the insertion part, wherein the movable shaft is configured such that, during switching from the movable shaft-side mounting state to the rotation shaft-side mounting state, the leading end of the movable shaft comes into abutment with the insertion-side end of the rotation shaft, followed by being pushed in up to an inside of the insertion part against energizing force of the energizing member.

3. The rotatable body mounting device of claim 1, wherein the exhaust equipment includes an exhaust port open in a position farther from the insertion part than the discharge port in the holding surface-side, and is configured to allow the exhaust air discharged from the discharge port to be exhausted outward from the exhaust port.

4. The rotatable body mounting device of claim 1, wherein the actuation mechanism is configured to allow for switching:
  from the movable shaft-side mounting state to the rotation shaft-side mounting state; and
  from the rotation shaft-side mounting state to the movable shaft-side mounting state.

5. The rotatable body mounting device of claim 1, wherein the rotatable body includes a magnetic disk and the mounting hole is defined in a center of the magnetic disk.

6. A hard disk manufacturing method for manufacturing a hard disk using the rotatable body mounting device of claim 5, the hard disk manufacturing method comprising:
  switching to the movable shaft-side mounting state; and
  switching from the movable shaft-side mounting state to the rotation shaft-side mounting state.

\* \* \* \* \*